United States Patent [19]

Masuda

[11] Patent Number: 4,523,430
[45] Date of Patent: Jun. 18, 1985

[54] FLUID FLOW CONTROL SYSTEM
[75] Inventor: Kenji Masuda, Takatsuki, Japan
[73] Assignee: Daikin Kogyo Co., Ltd., Osaka, Japan
[21] Appl. No.: 357,753
[22] Filed: Mar. 12, 1982
[30] Foreign Application Priority Data
  Mar. 19, 1981 [JP] Japan .................................. 56-41067
  Mar. 19, 1981 [JP] Japan .................................. 56-41068
[51] Int. Cl.³ .............................................. F16D 31/02
[52] U.S. Cl. ........................................ 60/420; 60/450;
                                                        60/452; 417/222
[58] Field of Search .................... 60/452, 450, 420;
                                                        417/218, 222

[56] References Cited
U.S. PATENT DOCUMENTS

| | | | |
|---|---|---|---|
| 2,892,312 | 6/1959 | Allen et al. | 60/427 |
| 3,758,235 | 9/1973 | Breeden | 417/222 |
| 3,820,920 | 6/1974 | Klimaszawski et al. | 417/218 |
| 4,011,721 | 3/1977 | Yip | 60/450 |
| 4,067,664 | 1/1978 | Robeller | 417/218 |
| 4,293,284 | 10/1981 | Carlson et al. | 60/450 |
| 4,325,677 | 4/1982 | Nonnenmacher | 417/218 |
| 4,401,009 | 8/1983 | Zeuner et al. | 60/452 |

FOREIGN PATENT DOCUMENTS

2913534 10/1980 Fed. Rep. of Germany ...... 417/218

Primary Examiner—Sheldon J. Richter
Assistant Examiner—Randolph A. Smith
Attorney, Agent, or Firm—Birch, Stewart, Kolasch & Birch

[57] ABSTRACT

A fluid flow control system has a capability of operating selectively in a power matching mode, in which power consumption is low, and a maximum flow mode in which high responsivity and high speed features can be appreciated. For this purpose, a mode selector valve is used to switch the system between these two modes.

12 Claims, 10 Drawing Figures

FLUID FLOW CONTROL SYSTEM

The present invention generally relates to a fluid flow control system suited for use in an injection molding machine or a vehicle and, more particularly, to a fluid flow control system operable selectively in a power matching mode, in which energy consumption is relatively low, and a maximum discharge flow mode in which high responsivity and high speed features can be appreciated.

Recently, injection molding machines, for example, have come to use a fluid flow control system operable in a power matching mode, which system comprises an orifice disposed on a main line leading from a variable-displacement pump and a load sensing valve operable in response to the pressure differential between the pressures on respective sides of the orifice for controlling a discharge flow control section of the variable-displacement pump to adjust the discharge rate of the variable-displacement pump to a value required to maintain the pressure differential substantially at a constant value. An example of this known fluid flow control system is disclosed in the U.S. Pat. No. 2,892,312, patented June 30, 1959.

This known fluid flow control system operable in the power matching mode is, since both the discharge rate and the discharge pressure of the variable-displacement pump are controlled in response to the load demand, advantageous in that the energy consumption is relatively low with no possibility of an unnecessary fluid discharge. However, it is disadvantageous in the responsivity and high speed feature because the discharge rate of the variable-displacement pump is controlled through the load sensing valve and a transmission element, such as the discharge flow control section, having a delay characteristic. Because of this, where a high speed molding operation is desired to be performed in the injection molding machine to manufacture highly molded articles, the fluid control system having a capability of operating only in the power matching mode is not suited for this purpose.

In addition, since the injection molding machine undergoes a sequence of metering, injection, mold clamping and mold release or opening processes, it has often been experienced that the high speed controllability is more important than the energy saving feature. In such case, the fluid flow control system operable only in the power matching mode is not suited for this purpose.

Accordingly, the present invention has been developed with a view to substantially eliminating the foregoing disadvantages and inconveniences inherent in the prior art fluid flow control system and has for its essential object to provide an improved fluid flow control system which is operable selectively in a power matching mode and a maximum discharge flow mode depending on the demand of a load to be controlled so as to attain a low energy consumption and a high responsivity, high speed feature one at a time according to the mode.

According to the present invention, the fluid flow control system having a capability of operating selectively under a power matching and a maximum discharge flow mode, which comprises a variable displacement pump having a discharge flow control section; at least one actuator; a main line extending between the pump and the actuator and having a restriction means such as orifice or choke disposed therein; a load sensing valve having pilot and spring chambers; a first fluid circuit including a power matching pilot line and a first pilot line, the differential pressure between the upstream and downstream sides of the restriction means being supplied to the pilot and spring chambers of the load sensing valve to operate said load sensing valve in such a way as to connect the discharge flow control section selectively to one of the main line and a fluid reservoir to control the discharge rate of the pump such that the differential pressure can be controlled to a predetermined value under the power matching mode; a branch line extending outwards from a portion of the main line upstream of the restriction means; a valve means disposed on the branch line and operable, when the load sensing valve is held standstill with the pump controlled to give the maximum discharge rate, to open; a mode selector valve disposed on the power matching pilot line for selectively closing and opening the power matching pilot line; and a second pilot line having a feed-in restriction such as an orifice or choke and fluid-connecting the spring chamber of the load sensing valve to a portion of the main line upstream of the restriction means, whereby, the power matching mode can be established when the power matching pilot line is opened to permit the load sensing valve and, on the other hand, the maximum discharge flow mode can be established when the power matching pilot line is closed to make the pressures respectively in the pilot and spring chambers of the load sensing valve equal to each other while the load sensing valve is held in one position by the action of a spring thereof thereby to permit the pump to give the maximum discharge rate and, at the same time, to permit the valve means to open.

The foregoing and other objects and features of the present invention will become readily understood from the following description taken in conjunction with preferred embodiments thereof with reference to the accompanying drawings, in which:

Figure 1:
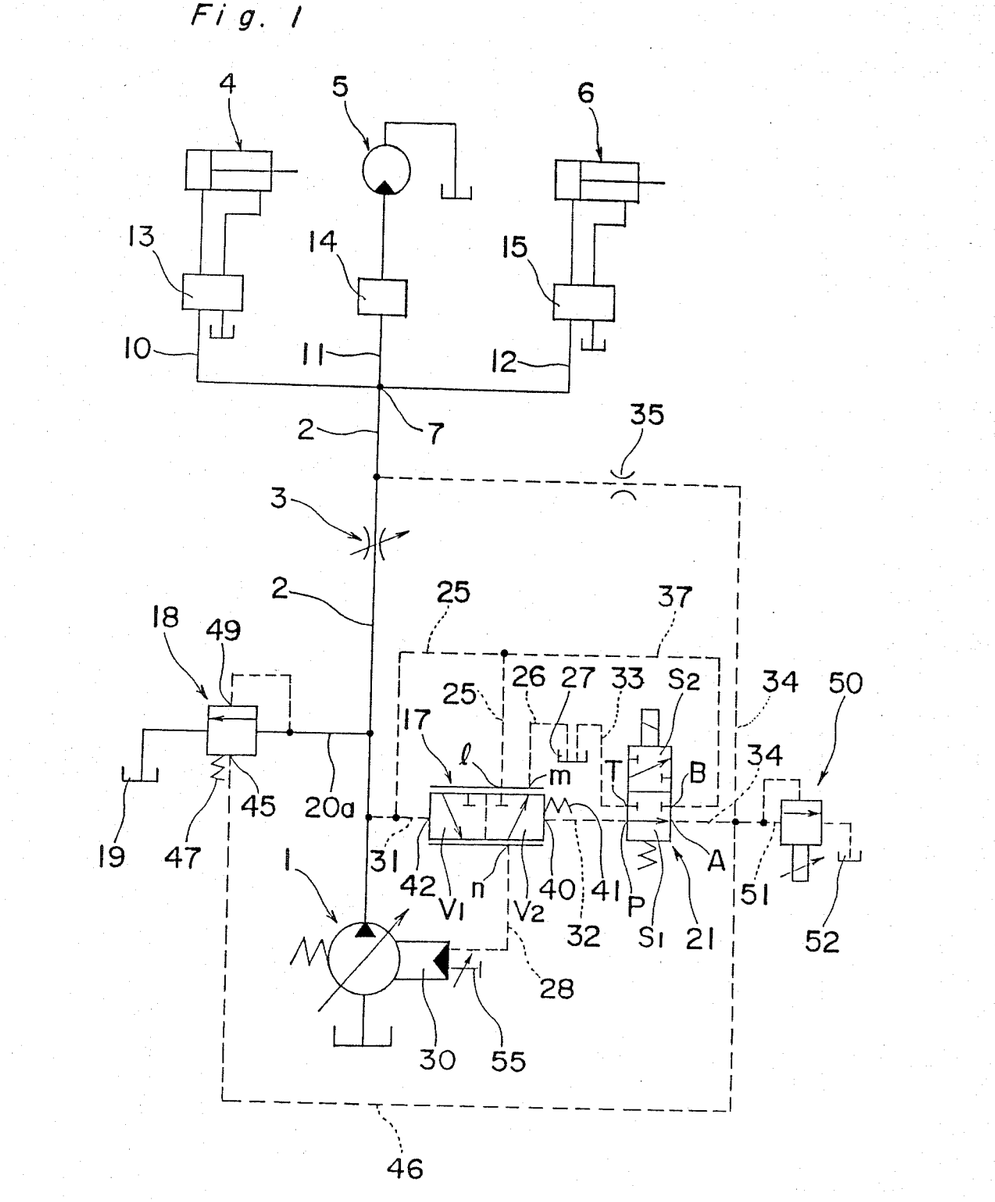
FIGS. 1, 3, 4, 7 and 8 are schematic fluid circuit diagrams, respectively, showing a fluid flow-control system according to first, second, third, fourth and fifth embodiments of the present invention.

Referring to FIG. 1, a variable-displacement pump 1, for example, a variable displacement piston pump of a type having a swash plate normally biased to the maximum permissible angle of inclination for giving a maximum discharge rate, has its discharge port fluid-connected with a main line 2. The main line 2 having an orifice 3 disposed thereon extends to a multi-joint coupling 7 from which branch lines 10, 11 and 12 extend outwards. The branch lines 10, 11 and 12 are in turn fluid-connected through switching valves 13, 14 and 15 to actuators 4, 5 and 6. The actuator 4 may be a hydraulic cylinder used in a mold clamping and releasing mechanism of an injection molding machine, the actuator 5 may be a hydraulic motor used in the same machine for driving a feed screw, and the actuator 6 may be a hydraulic cylinder used in the same machine for injecting a plasticized resinous material.

The fluid flow control system according to the embodiment shown in FIG. 1 comprises a load sensing valve 17, for example, a three port pilot valve, operable to control the discharge rate of the pump 1 in response to the pressure differential between the pressures downstream and upstream of the orifice 3, a by-pass type pressure compensated valve 18 disposed on a branch line 20a extending between a portion of the main line 2 upstream of the orifice 3 and a fluid reservoir 19, and a mode selector valve 21, for example, a two-position, four-port electromagnetically operated switching valve.

The load sensing valve 17 has three ports, l, m and n and is so designed that, when the valve 17 is set in a position shown by $V_1$, the ports l and n are communicated to each other while the port m is closed and, when it is set in a position $V_2$, the ports m and n are communicated to each other while the port l is closed. This valve 17 also has a spring chamber 40 having therein a spring 41, and a pilot chamber 42, said spring 41 exerting a biasing force which may correspond to a differential pressure of, for example, 6 kg/cm$^2$ so that, when the differential pressure between the pilot and spring chambers 42 and 40 exceeds 6 kg/cm$^2$, the valve 17 can be set in the position $V_1$ whereas, when the above described differential pressure is smaller than 6 kg/cm$^2$, the valve 17 can be set in the position $V_2$. The mode selector valve 21 is of such a design that, when it is set in a position shown by $S_1$, ports P and A thereof are communicated to each other while ports T and B are closed and, when it is set in a position shown by $S_2$, the ports P and B are communicated to each other while the ports T and A are closed.

The port l of the load sensing valve 17 is fluid-connected through a pilot line 25 to a portion of the main line 2 upstream of the orifice 3, and the port m thereof is fluid-connected to a fluid reservoir 27 through a pilot line 26. The port n of the load sensing valve 17 is communicated through a pilot line 28 to a discharge flow-control section 30 of the variable-displacement pump 1, which section 30 may be constituted by a swash plate control cylinder. The pilot chamber 42 of the valve 17 is communicated through a pilot line 31 to a portion of the main line 2 upstream of the orifice 3 and the spring chamber 40 is communicated to the port P of the mode selector valve 21 through a pilot line 32.

The port T of the mode selector valve 21 is communicated to the reservoir 27 through a pilot line 33 and the port A thereof is communicated to a portion of the main line 2 downstream of the orifice 3 through a pilot line 34 having an orifice 35 disposed thereon. The port B of the valve 21 is fluid-connected to the pilot line 25 through a pilot line 37.

The pilot line 32 and 34 constitute a power matching pilot line which is, when the mode selector valve 21 is set in the position $S_1$, completed to introduce a fluid pressure in that portion of the main line 2 downstream of the orifice 3 to the spring chamber 40 of the load sensing valve 17 and which is disconnected when the valve 21 is set in the position $S_2$ at which time a fluid pressure in that portion of the main line 2 upstream of the orifice 3 is introduced to the spring chamber 40 through the pilot line 37.

On the other hand, the by-pass type pressure compensated valve 18 has a spring chamber 45 communicated through a pilot line 46 to a portion of the pilot line between the port A of the selector valve 21 and the orifice 35.

The pilot lines 34 and 46 constitute a pressure matching pilot line operable to introduce the fluid pressure in that portion of the main line 2 downstream of the orifice 3 to the spring chamber 45 of the valve 18 irrespective of the position of the selector valve 21. A spring 47 housed in the spring chamber 45 is so selected as to exert a biasing force which may correspond to the differential pressure of, for example, 8 kg/cm$^2$ and, therefore, when the differential pressure between the pilot chamber 49 and the spring chamber 45, that is, the differential pressure between the respective portions of the main line 2 upstream and downstream of the orifice 3, exceeds 8 kg/cm$^2$, the pressure compensated valve 18 opens to drain an excessive fluid to a reservoir 19 to keep the above described differential pressure at a value equal to 8 kg/cm$^2$.

The junction between the pilot lines 35 and 34 is also communicated to a reservoir 52 through a line 51 having disposed thereon an electromagnetically operated proportional pilot relief valve 50.

It is to be noted that the variable-displacement pump 1 is shown as having an adjustment screw 55 for adjusting the maximum discharge rate thereof for avoiding any possible overload which would otherwise occur during the control operation under the pressure matching mode.

The fluid flow control system of the construction described hereinbefore with reference to FIG. 1 is caused to operate is the following manner.

At the start-up, a warm-up is performed in the following manner to increase the temperature of a fluid medium, for example, oil, thereby to reduce the viscosity of the fluid medium. For this purpose, the switching valves 13, 14 and 15 are closed and the mode selector valve 21 is set in the position $S_2$ to close the power matching pilot line. In this condition, the variable-displacement pump 1 is driven.

As the pump 1 is driven, the fluid pressure in that portion of the main line 2 upstream of the orifice 3 is introduced to the spring chamber 40 of the load sensing valve 17 through the pilot lines 31, 25, 37 and 32 and, at the same time, to the pilot chamber 42 thereof through the pilot line 31. Since the load sensing valve 17 is set in the position $V_2$ by the action of the spring 41, the discharge flow control section 30 of the pump 1 is communicated to the reservoir 27 so that the swash plate (not shown) of the pump 1 is inclined to assume the maximum angle of inclination determined by the position of the adjustment screw 55. In this condition, since the power matching pilot line (32, 34) is closed by the selector valve 21, the load sensing valve 17 remains set in the position $V_2$ irrespective of the differential pressure between the respective portions of the main line 2 upstream and downstream of the orifice 3 and, therefore, the variable-displacement pump 1 delivers a maximum discharge rate at all time during this condition.

On the other hand, the fluid pressure in the pressure matching pilot line (34, 46) extending between the spring chamber 45 of the valve 18 and the orifice 35 is equal to the set pressure of the pilot relief valve 50 and, accordingly, the valve 18 opens to such an opening as required to render the fluid pressure in that portion of the main line 2 upstream of the orifice 3 to be higher than said set pressure by 8 kg/cm$^2$ with any excessive fluid drained to the reservoir 19.

Thus, since the variable displacement pump 1 delivers the maximum discharge flow determined by the position of the adjustment screw 55 in correspondence to the set pressure of the pilot relief valve 50 and the fluid delivered from the pump 1 is totally drained to the reservoirs 19 and 52 through the valves 18 and 50, respectively, the pressure energy can be converted into the heat energy and, accordingly, the fluid flow control system is effective to quickly increase the temperature of the fluid medium, that is, the oil temperature, with the warm-up time consequently reduced. In other words, since the pressure control is effected at a high pressure while the pump 1 is permitted to deliver the maximum discharge flow under a pressure matching mode which is an example of the maximum discharge flow mode, high pressure energies can be converted into heat energies with the consequently reduced time required to perform the warm-up operation.

Subsequently, the selector valve 21 is set in the position $S_1$. When the valve 21 is so set, the discharge rate given by the pump 1 becomes zero and is in position to be controllable by the pressure determined by the pilot relief valve 50. If the switching valve 14 is opened to drive the hydraulic motor 5, while the above described condition has been established, so that the feed screw (not shown) can be rotated to effect a metering of a plasticized resinous material, the fluid pressure in that portion of the main line 2 upstream of the orifice 3 and that downstream of the orifice 3 are respectively supplied to the pilot chamber 42 of the valve 17 through the pilot line and to the spring chamber 40 of the same valve 17 through the selector valve 21 and the power matching pilot line (32, 34). Accordingly, the load sensing valve 17 operates in the following manner to maintain the differential pressure between the respective portions of the main line 2 upstream and downstream of the orifice 3 at a predetermined value by controlling the pump 1 to increase the discharge rate from the zero value to the value at which a necessary amount of fluid can be discharged therefrom. That is to say, the discharge rate of the variable-displacement pump 1 starts from the zero value and, in the case where the differential pressure between the respective portions of the main line 2 upstream and downstream of the orifice 3 is lower than the predetermined value (6 kg/cm$^2$), the differential pressure between the pilot and spring chamber 42 and 40 of the valve 17 to which the pressures upstream and downstream of the orifice 3 are respectively transmitted is of a value smaller than the biasing force of the spring and, therefore, the load sensing valve 17 is set in the position $V_2$. In this condition, the discharge flow control section 30 of the pump 1 is communicated to the reservoir 27 through the pilot line 28, the ports n and m of the valve 17 and the pilot line 26 so that the swash plate of the pump 1 can be inclined to assume the maximum angle of inclination to increase the discharge rate of the pump 1 for increasing the differential pressure in the respective portions of the main line 2 upstream and downstream of the orifice 3. It is to be noted that the response of the swash plate may be delayed at this time. On the other hand, if the pressure in the portion of the main line 2 upstream of the orifice 3 increases and the differential pressure in the respective portions of the main line 2 upstream and downstream of the orifice 3 subsequently becomes a value higher than the predetermined pressure (6 kg/cm$^2$), the differential pressure between the pilot and spring chambers 42 and 40 of the valve 17 becomes higher than the biasing force of the spring 41 in the spring chamber 40, thereby setting the valve 17 in the position $V_1$. Once this condition is established, the discharge flow control section 30 of the pump 1 is communicated to the main line 2 through the pilot line 28, the ports n and l of the valve 17 and the pilot line 25, so that the swash plate can be so inclined as to decrease the discharge rate of the pump 1, thereby reducing the differential pressure in the respective portions of the main line 2 upstream and downstream of the orifice 3. Summarizing the above, the load sensing valve 17 is set selectively in the positions $V_1$ or $V_2$ depending on the differential pressure in the respective portions of the main line 2 upstream and downstream of the orifice 3 so that the discharge rate of the pump 1 can be controlled to maintain said differential pressure at the predetermined value (6 kg/cm$^2$). At this time, although the pressure in that portion of the main line 2 downstream of the orifice 3 is transmitted to the spring chamber 45 of the by-pass type pressure compensated valve 18 through the pressure matching pilot line (34, 46) the valve 18 remains closed because the spring 47 is so selected as to exert a biasing force required to open the valve 18 when the differential pressure between the pilot and spring chambers 49 and 45 attains a value higher than 8 kg/cm$^2$. In other words, the by-pass type pressure compensated valve 18 is in an inoperative position and no control operation under the pressure matching mode occur. Accordingly, under this condition, the flow control takes place under the power matching mode wherein both of the discharge rate and the discharge pressure of the pump 1 is matched to the load demand with energy consumption being low. It is to be noted that, while the fluid control system operates under the power matching mode in the manner as hereinbefore described, the pressure in the main line 2 downstream of the orifice 3 is lower than the cracking pressure of the pilot relief valve 50 and, accordingly, the valve 50 remains closed. It is also to be noted that the metering speed can be varied by varying the opening of the orifice 3. However, even in this case, care must be taken to the delay in fluid flow control occurring as in the previously described case.

After the metering has completed, the switching valve 14 is closed and the selector valve 21 is set in the position $S_2$ to temporarily establish the same condition as under the pressure matching mode, and thereafter, the switching valve 15 is switched over to cause the injection cylinder 6 to advance for the purpose of filling the plasticized resinous material from a heated barrel (not shown) into a mold assembly in the injection molding machine.

Figure 2:
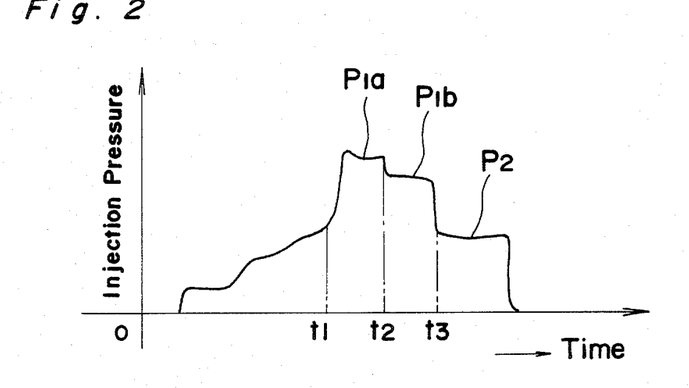
FIG. 2 is a graph showing the relationship between the passage of time and change in injection pressure.

At the instant that the selector valve 21 is set in the position $S_2$, the power matching pilot line (32, 34) which has been operated to transmit the pressure in that portion of the main line downstream of the orifice 3 to the spring chamber 40 of the load sensing valve 17 is closed by the selector valve 21 and, consequently, the fluid pressure in that portion of the main line 2 upstream of the orifice 3 is transmitted to the spring chamber 40 of the valve 17 through the ports P and B of the valve 21 and the pilot lines 37 and 32. Because of this, the load sensing valve 17 is set in and remains in the position $V_2$ as is the case during the warm-up operation and the pump 1 is locked at a position effective to discharge the fluid medium at a predetermined rate determined by the position of the adjustment screw 55. On the other hand, since the fluid pressure in that portion of the main line 2 downstream of the orifice 3 is transmitted to the spring chamber 45 of the valve 18 through the pressure matching pilot line (46, 34), the valve 18 selectively opens and closes depending on the differential pressure in the respective portions of the main line 2 upstream and downstream of the orifice 3 after the opening of the switching valve 15, with the excessive fluid consequently drained to the reservoir 19, thereby controlling the differential pressure in the respective portions of the main line 2 upstream and downstream of the orifice 3 to the predetermined value of 8 kg/cm$^2$. Because of this, incident to the filling of the resinous material into the mold assembly, the injection pressure, that is, the fluid pressure in that portion of the main line 2 downstream of the orifice 3 increases in a manner as shown in the graph of FIG. 2 with high responsivity and, therefore, with the flow control performed accurately. Especially, since this flow control takes place under the pressure matching mode in which the excessive fluid is drained to the reservoir 19 through the by-pass pressure compensated valve 18, that is to say, with a valve control at reduced transmission delay, the responsivity of the fluid flow during the opening of the switching valve 15 and the change of the orifice 3 is very good.

Upon completion of the filling of the resinous material into the mold assembly, the injection cylinder 6 which has been advanced to effect the injection of the resinous material returns to a standstill position at which no motion take place. And, the injection pressure abruptly increases as shown by a portion of the curve shown in FIG. 2 at a right-hand portion from the axis of the time $t_1$, thereby creating a primary pressure $P_{1a}$. This primary pressure $P_{1a}$ is determined by the set pressure of the pilot relief valve 50 which serves to maintain the fluid pressure at its input port at the set pressure. Therefore, the pressure in the spring chamber 45 of the valve 18 is equal to the set pressure thereof. In view of the above, the by-pass type pressure compensated valve 18 performs a pressure control at high responsivity under a control system wherein the fluid pressure in the main line 2 upstream of the orifice 3 correspond to the pressure $P_{1a}$ which is higher than the pressure in the spring chamber 45 by a value corresponding to the biasing force (8 kg/cm$^2$) of the spring 47. It is to be noted that the pump 1 is at this time operating to discharge the fluid medium at the maximum rate.

The selector valve 21 is, at the time $t_2$ shown in FIG. 1, set in the position $S_1$ in response to a switching signal derived in any suitable manner from the cylinder displacement, timer or fluid pressure, to effect the pressure control under the power matching mode. At this time, since the spring chamber 40 of the load sensing valve 17 is fluid-connected to the input port of the pilot relief valve 50 through the pilot lines 32, 34 and 51, the pressure inside the spring chamber 40 is controlled to the set pressure of the pilot relief valve 50 after the discharge rate of the pump 1 has been decreased. For this reason, the load sensing valve 17 is selectively set in the positions $V_1$ and $V_2$ so as to make the differential pressure between the pilot and spring chambers 42 and 40 equal to the biasing force of the spring 41, thereby controlling the fluid pressure in that portion of the main line 2 upstream of the orifice 3 to the primary pressure $P_{1b}$ which is somewhat lower than the primary pressure $P_{1a}$. At this time, the by-pass type pressure compensated valve 18 is nevertheless closed and held standstill. Normally, the load sensing valve 17 is set in a position intermediate between the positions $V_1$ and $V_2$ to control the swash plate in such a way as to maintain the discharge rate at a small value. Accordingly, even at this time, no loss of power occurs substantially. It is, however, to be noted that the differential pressure between the pilot and spring chambers 42 and 40 is established because of the flow of the fluid medium from the pump 1 to the pilot relief valve 50.

When a predetermined time passes from the time $t_2$ to the time $t_3$ as shown in FIG. 2, the current supplied to the pilot relief valve 50 is caused to decrease to lower the set pressure thereof to establish a filling pressure, i.e., a secondary pressure shown by $P_2$ in FIG. 2.

The pressure control to establish the secondary pressure $P_2$ is carried out by the load sensing valve 17 in a manner similar to that to establish the primary pressure $P_{1b}$. In other words, the valve 17 operates in such a way as to make the differential pressure between the pressure inside the pilot chamber 42 and the pressure inside the spring chamber 40 which is the set pressure of the pilot relief valve 50 correspond to the biasing force of the spring 41, so that the filling pressure can be maintained at the secondary pressure $P_2$. It is to be noted that the timing at which the pressure matching mode is to be switched over to the power matching mode may not be always limited to the time $t_1$, but it may be the time $t_2$ or $t_3$. It is also to be noted that the speed control of the injection cylinder may be carried out under the power matching mode as is the case of the control of the metering motor used in the injection molding machine for metering the resinous material and, in such case, the by-pass type pressure compensated valve 18 serves concurrently to absorb an abnormal pressure increase (surge pressure) which would take place in that portion of the main line 2 upstream of the orifice 3 when the opening of the orifice 3 is abruptly reduced or as a result of a delay in decreasing the discharge rate of the pump 1 which would occur during the transfer from a speed control region to a pressure control region (subsequent to the time $t_1$).

As hereinabove described, the fluid flow control system shown in FIG. 1 is such that it operates under the power matching mode when the selector valve 21 is set in the position $S_1$ to open both the power matching pilot line (32, 34) and the pressure matching line (34, 46) to bring the by-pass type pressure compensated valve 18 and the load sensing valve 17 into inoperative and operative positions, respectively, depending on the difference between the set pressure of the springs 41 and 47, thereby coping with the demand for the reduced energy consumption feature and also such that it operates under the pressure matching mode when the valve 21 is set in the position $S_2$ to close and open the power matching pilot line (34, 32) and the pressure matching pilot line, respectively, to introduce the fluid pressure in the main line 2 upstream of the orifice 3 into the spring chamber of the load sensing valve 17 through the pilot line 37 for bringing the valve 17 into the inoperative position at the maximum discharge rate and, at the same time, to bring the by-pass type pressure compensated valve 18 into the operative position, thereby coping with the demand for the high responsivity feature. It is to be noted that the pressure matching mode referred to herein is effective even in a servo-mechanism (not shown. Closed control) wherein the velocity and the pressure are fed back to the orifice 3 and the relief valve 50.

Figure 3:
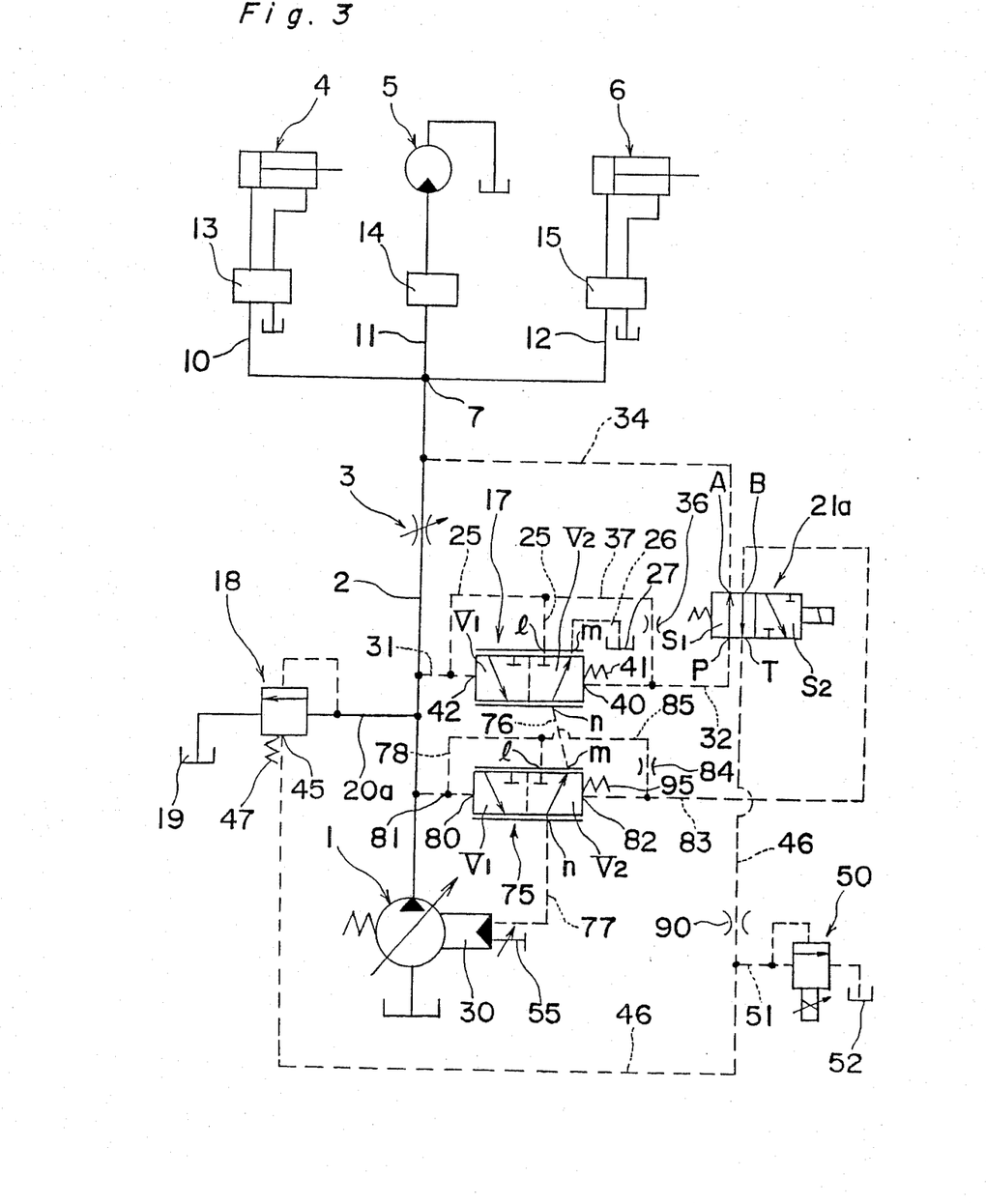

FIG. 3 illustrates another embodiment of the present invention. The fluid flow control system shown in FIG. 3 differs from that shown in FIG. 1 in the following points which will now be described.

In the fluid flow control system shown in FIG. 3, a pilot valve 75 for the pressure control of the variable-displacement pump is additionally utilized for the purpose of improving the pressure control preciseness of such as a pressure override characteristic. In addition, instead of the mode selector valve 21 used in the embodiment shown in FIG. 1, a mode selector valve 21a is used for effecting the switching between the modes irrespective of the relationship in biasing force between the spring 41 in the load sensing valve 17 and the spring 47 in the by-pass type pressure compensated valve 18. Yet, a feed-in orifice 36 is utilized on the pilot line 37 extending between the pilot lines 25 and 32.

The pilot valve 75 is of a construction indentical with the load sensing valve 17. The pilot valve 75 has a port m communicated to the port n of the load sensing valve through a pilot line 76, a port n communicated to the discharge flow control section 30 of the variable-displacement pump 1 through a pilot line 77, and a port l communicated through a pilot line 78 to that portion of the main line 2 upstream of the orifice 3. This pilot valve 75 also has a pilot chamber 80 communicated through a pilot line 81 to that portion of the main line 2 upstream of the orifice 3 and a spring chamber 82 fluid-connected to the port B of the mode selector valve 21a through a pilot line 83 and also to the pilot line 78 through a pilot line 85 which has a feed-in orifice 84 disposed thereon.

The mode selector valve 21a is so designed that, when it is set in the position $S_1$, the ports P and A and the ports B and T are communicated to each other, but when in the position $S_2$, the ports A and T are communicated to each other while the ports B and T are disconnected from each other.

The valve 21a has the port A communicated through the pilot line 34 to that portion of the main line 2 downstream of the orifice 3, and the port P communicated through the pilot line 32 to the spring chamber 40 of the load sensing valve 17. The pilot lines 34 and 32 altogether constitute a power matching pilot line. The pilot line 32 is also fluid-connected to that portion of the main line 2 upstream of the orifice 3 through the pilot line 37 having the feed-in orifice 36 disposed thereon. The port T of the mode selector valve 21a is fluid-connected to the spring chamber 45 of the bypass type pressure compensated valve 18 through the pilot line 46 having an orifice 90 disposed thereon. The pilot lines 46 and 34 altogether constitute a pressure matching pilot line. The pilot relief valve 50 is disposed between the orifice 90 and the spring chamber 45 of the valve 18.

The fluid flow control system shown in FIG. 3 is such that, when the mode selector valve 21a is set in the position $S_1$, the power matching pilot line (32, 34) is opened while the pressure matching pilot line (34, 46) is closed. Since during the flow control the fluid pressure in that portion of the main line 2 upstream of the orifice 3 is fed to the spring chamber 82 of the pilot valve 75 through the pilot line 81, 78, 85 and 83, the pilot valve 75 is set in the position $V_2$ and held thereat. Also, since the fluid pressure in that portion of the main line 2 upstream of the orifice 3 is fed to the spring chamber 45 of the valve 18 through the pilot line 83, the ports B and T of the selector valve 21a and the pilot line 46, the bypass pressure compensated valve 18 is closed and held in an inoperative position. On the other hand, since the fluid pressure in that portion of the main line 2 downstream of the orifice 3 is fed to the spring chamber 40 of the load sensing valve 17 through the pilot line 34, the ports A and P of the selector valve 21a and the pilot line 32, the load sensing valve 17 is selectively set in the position $V_1$ and the position $V_2$ to control the discharge flow control section 30 of the pump 1 for maintaining at the constant value the differential pressure between the respective portions of the main line 2 upstream and downstream of the orifice 3. In this condition, the flow control system operates in the energy-saving power matching mode in which the discharge rate and the discharge pressure of the variable displacement pump 1 match with the load demand. In addition, since the fluid medium is supplied from the main line 25 to the spring chamber 40 of the load sensing valve 17 through a relatively short fluid path which is constituted by the pilot line 37 having the feed-in orifice 36, the load sensing valve 17 can respond quickly.

When the flow control is switched over to a pressure control wherein no discharge flow is required and the injection cylinder 6 is held stand and wherein the pressure in a portion of the pilot line 46 between the spring chamber 45 of the bypass type pressure compensated valve 18 and the orifice 90 attains a value equal to the set pressure of the relief valve 50, the pilot valve 75 is caused to be in the position $V_1$ to make the differential pressure between the pilot chamber 80 and the spring chamber 82 correspond to the biasing force of a spring 95 in the spring chamber 82, thereby setting the swash plate of the pump 1 at a neutral position. Even at the initial stage of this operation, the system can operate to maintain the differential pressure between the respective portions of the main line 2 upstream and downstream of the orifice 3 at the constant value and, therefore, the system according to the embodiment shown in FIG. 3 can exhibit a better pressure override characteristic than that according to the embodiment shown in FIG. 1. In other words, since in the embodiment shown in FIG. 1, the load sensing valve 17 is set in a substantially intermediate position between the positions $V_1$ and $V_2$, a slight amount of the fluid medium flows through the relief valve 50 when the load pressure increases to a value equal to the cracking pressure of the relief valve 50. When this occurs, the differential pressure is developed between the pilot and spring chambers 42 and 40 of the load sensing valve 17, where for the load sensing valve 17 is immediately switched over to the position $V_1$ to reduce the discharge rate of the variable displacement pump 1. On the contrary thereto, in the embodiment shown in FIG. 3, even though a slight amount of the fluid medium flows through the relief valve 50 in the manner as hereinabove described, the pilot valve 75 remains set at the position $V_2$ before the differential pressure between the pilot and spring chambers 82 and 80 of the pilot valve 75 attains a value greater than the biasing force of the spring 95. Accordingly, since there is no possibility that the discharge rate of the pump 1 is reduced by the pilot valve 75 and since the load sensing valve 17 serves to maintain the differential pressure between the upstream and downstream rides of the orifice 3 at the predetermined value until the discharge rate of the pump 1 is reduced by the pilot valve 75, an accurate fluid flow control can be appreciated.

On the other hand, when the mode selector valve 21a is set in the position $S_2$ during the flow control, the power matching pilot line (34, 32) is closed while the pressure matching pilot line (34, 46) is opened.

Since the ports P and B of the selector valve 21a are disconnected from each other, the pressure in the spring chamber 40 of the load sensing valve 17 is equalized by the pilot line 37 having the feed-in orifice 36, to the pressure in that portion of the main line 2 upstream of the orifice 3 and, at the same time, the pressure in the spring chamber of the pilot valve 75 is equalized by the pilot line 85, having the feed-in orifice 84, to the pressure in that portion of the main line 2 upstream of the orifice 3. Because of this, the load sensing valve 17 and the pilot valve 75 are set in the respective position $V_2$ and held thereat, thereby communicating the discharge flow-control section 30 of the pump 1 to the reservoir 27 through the pilot lines 77, 76 and 26. Therefore, the pump 1 discharges at its maximum discharge rate determined by the adjustment screw 55.

Also, since the fluid pressure in that portion of the main line 2 downstream of the orifice 3 is fed to the spring chamber 45 of the bypass type pressure compensated valve 18 through the pilot line 34, the ports A and T of the selector valve 21a and the pilot line 46, the valve 18 operates to drain the excessive fluid medium to the reservoir 19 to maintain the differential pressure between the respective portions of the main line 2 upstream and downstream of the orifice 3 at the constant value. Thus, the system operates in the pressure matching mode wherein the responsivity is high.

Hereinafter, the fluid flow control system according to a third preferred embodiment of the present invention will be described with reference to FIG. 4.

Figure 4:
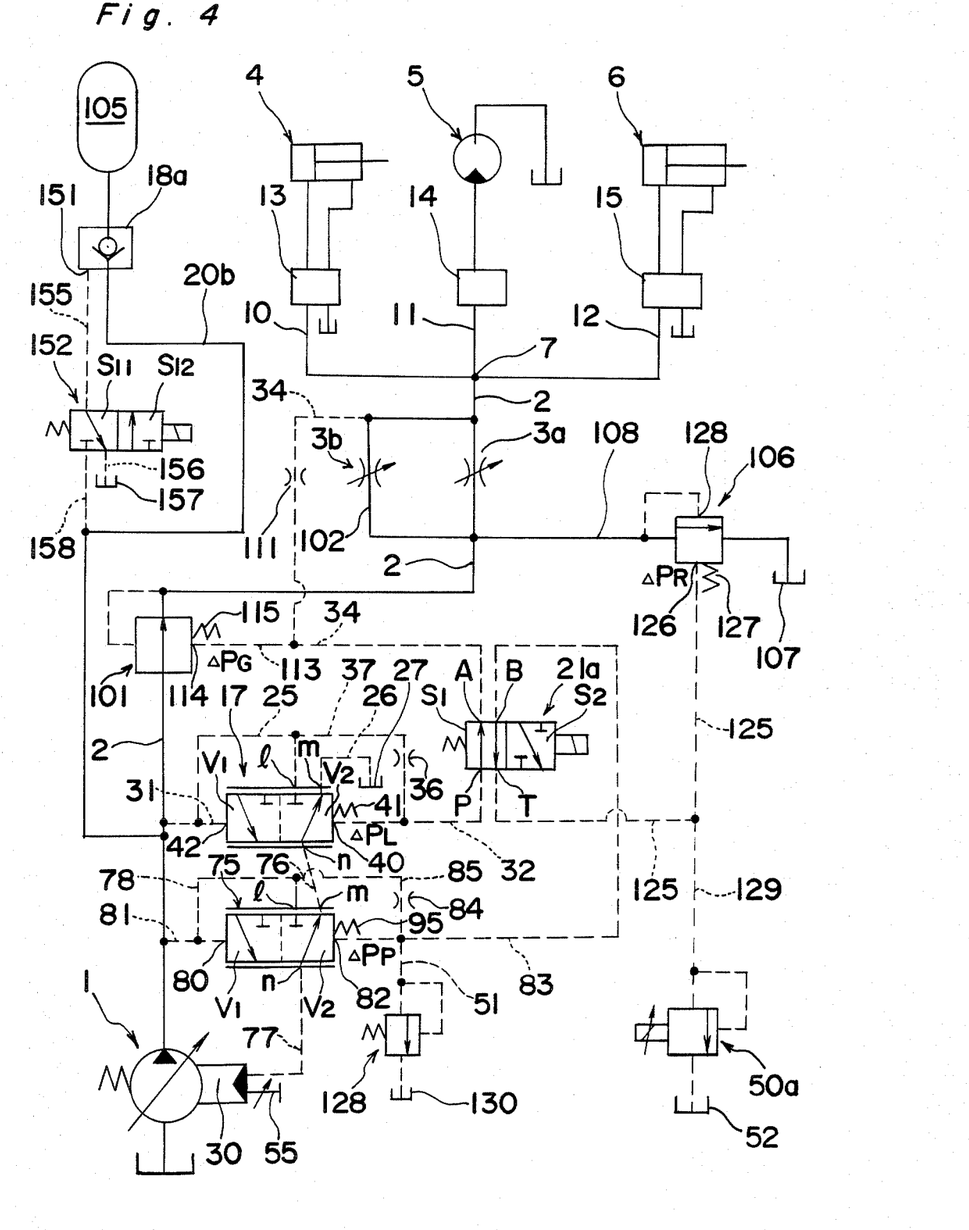

Referring now to FIG. 4, a variable-displacement pump 1 has its discharge port fluid-connected with a main line 2. The main line 2 has a pressure reduction type pressure compensated valve 101 and a first orifice 3a on one side of the valve 101 opposite to the pump 1. This main line 2 extends to a multi-joint coupling 7 from which branch lines 10, 11 and 12 extend outwards. These branch lines 10, 11 and 12 are in turn fluid-connected through switching valves 13, 14 and 15 to actuators 4, 5 and 6, respectively. The actuators 13, 14 and 15 may be a hydraulic cylinder used in a mold clamping and releasing mechanism of the injection molding machine, a hydraulic motor used in the same machine for driving a feed screw, and a hydraulic cylinder used in the same machine for injecting a plasticized resinous material. A portion of the main line 2 between the valve 101 and the coupling 7 has a bypass line 102 having a second orifice 3b arranged in parallel to the first orifice 3a.

The fluid flow control system shown in FIG. 4 comprises a load sensing valve 17, a pressure control pilot valve 75 of a construction identical with the valve 17, a mode selector valve 21a which may be a two-position four-port switching valve, an accumulator 105 communicated through a line 20b to a portion of the main line 2 upstream of the valve 101, a shut-off valve 18a which may be a pilot check valve disposed on the line 20b, and a surge pressure absorbing valve 106 disposed on a line 108 which connects a portion of the main line 2 between the valve 101 and the first orifice 3a with a reservoir 107.

The load sensing valve 17 is so designed that, when it is set in a position shown by $V_1$, ports l and n thereof are communicated to each other while a port m thereof is closed and that, when it is set in a position shown by $V_2$, the ports m and n are communicated to each other while the port l is closed. This valve 17 has a spring chamber 40 having therein a spring 41 capable of exerting a biasing force $\Delta P_L$ such that, when the differential pressure between a pilot chamber 42 thereof and the spring chamber 40 exceeds the biasing force $\Delta P_L$, the valve 17 is set in the position $V_1$, but when said differential pressure is smaller than the biasing force $\Delta P_L$, it is set in the position $V_2$. The pilot valve 75 has a spring chamber 82 accommodating therein a spring 95 capable of exerting a biasing force $\Delta P_P$. The mode selector valve 21a is of such a design that, when it is set in a position shown by $S_1$, ports P and A as well as ports B and T thereof are communicated to each other and, when it is set in a position shown by $S_2$, the ports A and T are communicated to each other while the ports P and B are disconnected from each other.

The load sensing valve 17 has a port l fluid-connected to a portion of the main line 2 upstream of the valve 101 through a pilot line 25, a port m fluid-connected to the reservoir 27 through a pilot line 26, and a port n fluid-connected to a port m of the pilot valve 75 through a pilot line 76. The pilot valve 75 has, in addition to the port m, a port n fluid-connected to a discharge flow control section 30, which may be constituted by a swash plate control cylinder, of the pump 1 through a pilot line 77 and a port l fluid-connected to a portion of the main line 2 upstream of the valve 101 through a pilot line 78.

The load sensing valve 17 also has a pilot chamber 42 communicated through a pilot line 31 to a portion of the main line 2 upstream of the valve 101, and a spring chamber 40 communicated to the port P of the selector valve 21a through a pilot line 32. The pilot line 32 is in turn connected to a portion of the main line 2 upstream of the valve 101 through a pilot line 37 having a feed-in orifice 36 disposed thereon.

The pilot valve 75 also has a pilot chamber 80 communicated to a portion of the main line 2 upstream of the valve 101 through a pilot line 81 whereas the pilot valve 75 has a spring chamber 82 communicated to the port B of the selector valve 21a through a pilot line 83. The pilot 83 is in turn communicated to a portion of the main line 2 upstream of the valve 101 through a pilot line 85 having a feed-in orifice 84 and also to the reservoir 130 through a pilot line 51 having a pilot relief valve 128 for controlling the charge pressure of the accumulator.

The port A of the mode selector valve 21a is communicated to a portion of the main line 2 downstream of the first orifice 3a through a pilot line 34 which, together with the pilot line 32, constitutes a power matching pilot line. The pilot line 34 has an orifice 111 disposed thereon, a portion of this pilot line 34 between the orifice 111 and the port A of the selector valve 21a being communicated to the spring chamber 114 of the valve 101 through a pilot line 113. The spring chamber 114 for a spring 115 capable of exerting a biasing force $\Delta P_G$ and the differential pressure between the upstream and downstream sides of the first and second orifices 3a and 3b is controlled to a value equal to the biasing force $\Delta P_G$.

The port T of the selector valve 21a is communicated to the spring chamber 126 of the surge pressure absorbing valve 106 through a pilot line 125. The spring 127 in the spring chamber 126 of the valve 106 exerts a biasing force $\Delta P_R$ and the valve 106 opens when the differential pressure between the spring and pilot chambers 126 and 128 exceeds the biasing force $\Delta P_R$. It is to be noted that the biasing force $\Delta P_R$ is selected to be larger than the biasing force $\Delta P_G$. The pilot line 129 is fluid-connected to a reservoir 52 through a pilot line 129 having an electromagnetic proportional pilot relief valve 50a disposed thereon.

The pilot valve 18a which is an example of the shut-off valve has a port 151 adapted to be communicated to a reservoir 157 through pilot lines 155 and 156 when an electromagnetic switching valve 152 is set in a position shown by $S_{11}$, thereby to avoid any possible reverse flow of the fluid medium, and also to be communicated to a branch line 20b through pilot lines 155 and 158 when it is set in a position shown by $S_{12}$, thereby to open the check valve 18a to permit the fluid medium stored in the accomulator 105 to be discharged therethrough.

The pump 1 has an adjustment 55 for regulating the maximum discharge rate by positioning a swash plate at a maximum angle of inclination so that any possible overload condition of a prime mover (not shown) can be avoided. However $\Delta P_R > \Delta P_P$ must be established.

The flow control system of the construction described above with reference to FIG. 4 operates in the following manner.

(1) In the case where the biasing force $\Delta P_G$ is so selected as to be larger than the biasing force $\Delta P_L$:

In this case, the selector valve 21a and the switching valve 152 are set in the respective positions $S_1$ and $S_{11}$, the second orifice 3b is completely closed, and the current applied to the pilot relief valve 50a is increased from a zero value to a predetermined value while, at the same time, the switching valve 15 is caused to open to advance the injection cylinder 6. It is, however, to be noted that the metering of the resinous material inside the feed screw by the operation of the hydraulic motor 5 is assumed to have already been completed.

When this is done, the discharge rate of the pump 1 increases from a zero value. However, since the pressure at the discharge port of the pump 1 is lower than the set pressure of the pilot relief valve 50a during the advance of the injection cylinder 6, the fluid pressure upstream of the valve 101 is fed to the pilot and spring chambers 80 and 82 of the pilot valve 75 through the respective pilot lines 81 and 85. Therefore, the pilot valve 75 is set in the position $V_2$. At this time, the fluid pressure upstream of the valve 101 is fed to the pilot chamber 42 of the load sensing valve 17 through the pilot line 31 and, on the other hand, the fluid pressure downstream of the first orifice 3a is fed to the spring chamber 40 of the valve 17 through the ports A and P and the power matching pilot line (32, 34). Because of this, the valve 17 is, when the differential pressure between the pilot and spring chambers 42 and 40 is of a value smaller than the biasing force $\Delta P_L$, set in the position $V_2$ to communicate the discharge flow control section 30 of the pump 1 to the reservoir 27 through the pilot line 77, the pilot valve 75, the pilot line 76 and the pilot line 26 to cause the swash plate of the pump 1 to be so inclined as to give the maximum discharge rate. It is to be noted that the responsivity of the swash plate is somewhat delayed at this time. On the other hand, when the differential pressure between the pilot and spring chambers 42 and 40 increases to a value larger than the biasing force $\Delta P_L$, the load sensing valve 17 is set in the position $V_1$ to communicate the discharge flow control section 30 of the pump 1 to a portion of the main line 2 upstream of the valve 101 through the pilot line 77, the pilot valve 75, the pilot line 76 and the pilot line 25, thereby causing the swash plate of the pump 1 to be inclined towards a neutral position to decrease the discharge rate. In this way, the valve 17 serves to control the discharge rate of the pump 1 to make the differential pressure between the upstream and downstream sides of the first orifice 3a equal to the biasing force $\Delta P_L$. This operation of the load sensing valve 17 takes place quickly because the fluid medium is introduced to the spring chamber 40 through a short path 37 having the feed-in orifice 36 disposed thereon.

On the other hand, since the fluid pressure downstream of the first orifice 3a is introduced to the spring chamber 114 through the pilot lines 34 and 113, the valve 101 tends to control the differential pressure between the upstream and downstream sides of the first orifice 3a to a value equal to the biasing force $\Delta P_G$. However, since the biasing force $\Delta P_G$ is so selected as to be larger than the biasing force $\Delta P_L$ as hereinbefore described, and since the valve 17 is operating to control the differential pressure between the upstream side of the valve 101 and the downstream side of the first orifice 3a to a value equal to the biasing force $\Delta P_L$, the valve 101 does not operate while remaining opened.

On the other hand, it is assumed that the accumulator 105 is filled with the fluid medium under a pressure higher than the pressure of the fluid medium discharged from the pump 1 during the advance of the injection cylinder 6. Because the switching valve 152 is set in the position $S_{11}$ the check valve 18a is closed relative to the above described high pressure fluid medium and, accordingly, the accumulator 105 neither discharge nor receive any fluid medium.

Figure 5:
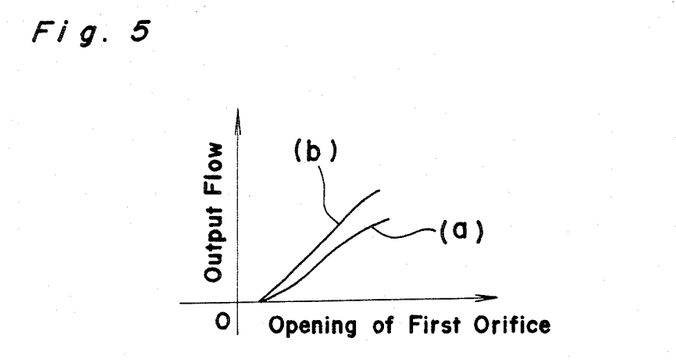
FIGS. 5 and 6 are respective graphs showing the relationship between the opening of a first orifice and the output flow.

Accordingly, at this time, the pump 1 is controlled to match the discharge pressure and the discharge rate with the load demand and the power matching mode in which the energy consumption is low is performed to the first orifice 3a. The relationship between the opening of this first orifice and the output flow is shown by a curve a in the graph of FIG. 5.

It is to be noted that, by varying the opening of the orifice 3a, the injection speed can be varied. Even in this case, a delay occurs in the responsivity of the fluid flow control.

In addition, the pilot relief valve 50a is assumed to be closed during the above described operation.

Assuming that the above described flow control is switched over to the pressure control in which the filling of the resinous material performed by the injection cylinder 6 has completed, the pressure inside the pilot lines 83, 125 and 129 between the valve 50a and the feed-in orifice 84 is controlled by the valve 50a to a value equal to its set pressure. At this time, the pilot valve 75 is selectively set in the position $V_1$ or in the position $V_2$ to make the differential pressure between the pressure inside the pilot chamber 80 and the pressure, i.e., the set pressure, inside the spring chamber 82 to be a value equal to the biasing force $\Delta P_P$ and is normally held in a position intermediate between the positions $V_1$ and $V_2$. Therefore, the discharge flow control section 30 of the pump 1 is communicated to the main line 2 through the pilot lines 77, 78 and 81 so as to position rapidly the swash plate at the neutral position whereby with a very slight discharge rate, the pressure inside the main line 2 can be controlled to the predetermined value. It is to be noted that, although the flow decreases abruptly during the transit period in which the speed control region shifts to the pressure control region, the operation of the swash plate is delayed at this time and, therefore, the surge pressure tends to occur in the main line 2. However, any possible surge pressure occurring in the main line 2 can be absorbed by the surge pressure absorbing valve 106. If the shift from the above described flow control to the pressure control takes place slowly at the initial stage of the transit period, the load sensing valve 17 can operate to control the differential pressure between the upstream and downstream sides of the first orifice 3a to a value equal to the biasing force $\Delta P_L$ and therefore, the pressure override characteristic of the fluid flow control system is very good. In other words, even when a slight fluid flow takes place through the relief valve 50a as a result of the increase in the load pressure, an accurate flow control can be performed maintaining at the constant value the differential pressure between the upstream and downstream sides of the first orifice 3a before the pilot valve 75 is completely switched.

The flow control under an accumulator mode which is an example of a maximum discharge flow mode takes place in the following manner.

In the first place, after the selector valve 21a has been set in the position $S_2$, the electromagnetic switching valve 152 is set in the position $S_{12}$ and, at the same time, the switching valve 15 is switched.

When this has been done, the port P of the selector valve 21a is closed and, therefore, only the fluid pressure in the portion of the main line 2 upstream of the valve 101 is fed to the spring chamber 40 of the valve 17 through the pilot line 37 having the feed-in orifice 36 thereon. For this reason, the valve 17 is set in the position $V_2$ and held standstill thereat. Similarly, since the port B of the selector valve 21a is closed, the spring chamber 82 of the pilot valve 83 is applied with the fluid pressure in the portion of the main line 2 upstream of the valve 101 through the pilot line 85 having the feed-in orifice 83 and, accordingly, the pilot valve 75 is set in and held at the position $V_2$. Therefore, the discharge flow control section 30 of the pump 1 is communicated to the reservoir 27 with the discharge rate locked at a maximum value as determined by the position of the adjustment screw 55.

However, the pilot port 151 of the check valve 18a is, since the switching valve 152 is set in the position $S_{12}$ at this time, communicated to the branch line 20b through the pilot lines 155 and 158. For this reason, the check valve 18a is opened with the fluid medium in the accumulator 105 consequently discharged to the main line 2 through the check valve 18a and the line 20b.

At the same time, since the fluid pressure downstream of the first orifice 3a is fed to the spring chamber 114 of the valve 101 through the pilot line 34, the orifice 111 and the pilot line 113, the valve 101 operates to reduce the pressure of a combined stream of the fluid medium, discharged in a maximum discharge rate from the pump 1 then operating at a fixed volumetric pump, with the fluid medium discharged from the accumulator 105, so that the differential pressure between the upstream and downstream sides of the first orifice 3a can be controlled to a value equal to the biasing force $\Delta P_G$ of the spring 115 of the valve 101. Since the fluid flow control in which the differential pressure between the upstream and downstream sides of the first orifice 3a is controlled to the predetermined value by the use of the valve 101 in a so-called valve controlled scheme, a high responsive, highly accurate fluid control can be achieved at a moderately high speed at the beginning of the injection. In addition, since the fluid medium discharged from the accumulator 105 is utilized, the actuators 4, 5 and 6 can be driven at high speed. The relationship between the opening of the first orifice 3a and the output flow is shown by a curve b in the graph of FIG. 5. It is to be noted that, since the biasing force $\Delta P_G$ is larger than the biasing force $\Delta P_L$, the differential pressure between the upstream and downstream sides of the first orifice 3a which is attained during the accumulator mode of operation in which the valve 101 operates is larger than that attained during the power matching mode of operation. Accordingly, as shown by the curves a and b in the graph of FIG. 5, the output flow during the accumulator mode is larger than that during the power matching mode.

It is also to be noted that, during this accumulator mode, the pilot relief valve 128 operates as s safety valve or a charge pressure control valve for the accumulator and the load pressure control is performed by the relief valve 50a. Where the pressure control is initiated under the accumulator mode, the surge pressure on the side of the accumulator is absorbed by the surge absorbing valve 106.

(2) In the case where the biasing force $\Delta P_G$ is so selected as to be smaller than the biasing force $\Delta P_L$:

In this case, the selector valve 21a and the switching valve 152 are set in the respective positions $S_1$ and $S_{11}$, the second orifice 3b is completely closed, and the switching valve 15 is caused to open simultaneously with the relief valve 50a to advance the injection cylinder 6.

When this is done, as is the case with the previously discussed case (1), the fluid flow control system operates under the power matching mode. However, since the biasing force $\Delta P_G$ is smaller than the biasing force $\Delta P_L$, the valve 101 operates even during the power matching mode to control the differential pressure between the upstream and downstream sides of the first orifice 3a to a value equal to the biasing force $\Delta P_G$. That is to say, the valve 101 and the first orifice 3a altogether constitutes a flow control valve. That is to say, in addition to the control of the differential pressure between the pressure upstream of the valve 101 and that downstream of the first orifice 3a to a value equal to the biasing force $\Delta P_L$, the differential pressure between the upstream and downstream sides of the first orifice 3a is controlled by the valve 101. Accordingly, a high responsivity can be appreciated even during the operation under the power matching mode. This is because the control is performed by the valve 101 at this time irrespective of the pump 1.

Figure 6:
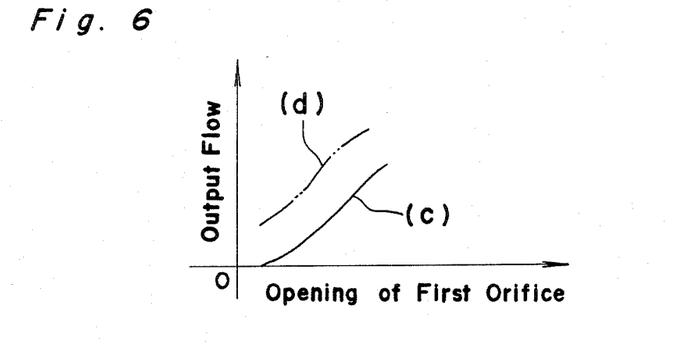

When the selector valve 21a and the switching valve 152 are subsequently set in the respective positions $S_2$ and $S_{12}$, the fluid flow control system operates under the accumulator mode as is the case with the previously discussed case (1). Therefore, the valve 101 controls the differential pressure between the upstream and downstream sides of the first orifice 3a to a value equal to the biasing force $\Delta P_G$. Accordingly, under the condition in which the biasing force $\Delta P_G$ is smaller than the biasing force $\Delta P_L$, the relationship between the opening of the first orifice 3a and the output flow is such as shown by a curve c in the graph of FIG. 6 which is substantially identical with that exhibited during the power matching mode. It is to be noted that a curve d shown in the graph of FIG. 6 illustrates the relationship between the opening of the first orifice 3a and the output flow which is attained when the second orifice 3b is opened during the accumulator mode, from which curve d, it is clear that the output flow is increased by an increment determined by the second orifice 3b. Nevertheless, the differential pressure between the upstream and downstream sides of the second orifice 3b is also controlled by the valve to a value equal to the biasing force $\Delta P_L$.

Figure 7:
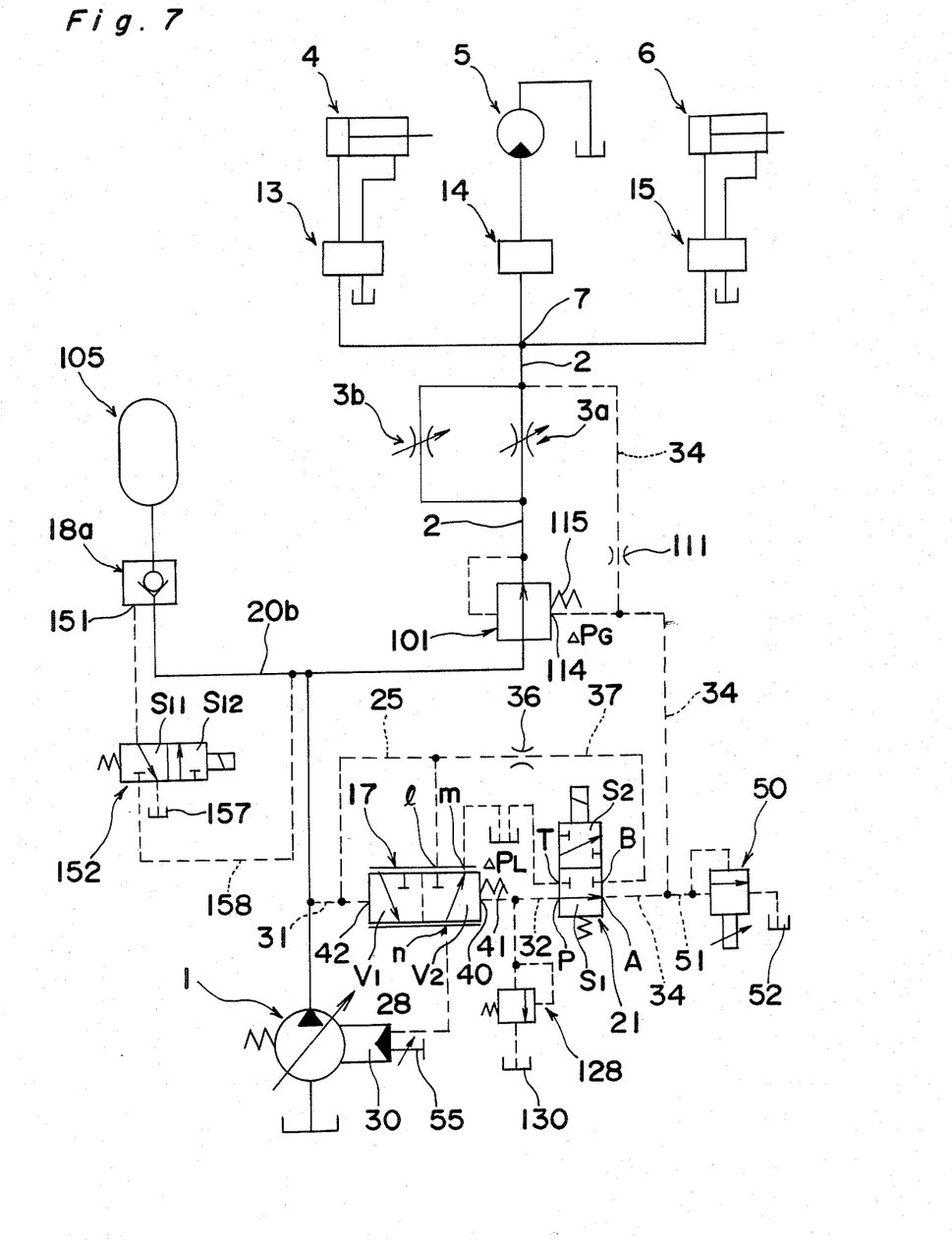

The embodiment shown in FIG. 7 differs from the thrid embodiment shown in FIG. 4 in that the function of the pilot valve 75 used in the third embodiment is taken by the load sensing valve 17 and in that, instead of the selector valve 21a used in the third embodiment, the same selector valve 21 as in the first embodiment is used.

The fluid flow control system shown in FIG. 7 operates in such a manner that, when the selector valve 21 is set in the position $S_1$, the power matching pilot line 34 is opened to permit the fluid pressure downstream of the first orifice 3a to be fed to the spring chamber 40 of the load sensing valve 17. And, during the flow control, the valve 17 operates in response to the differential pressure between the pressure upstream of the valve 101 and that downstream of the first orifice 3a to control the discharge rate of the pump 1 under the power matching mode. Where the biasing force $\Delta P_G$ of the spring 115 in the valve 101 is smaller than the biasing force $\Delta P_L$ of the spring 41 of the valve 17, the valve 101 is under operating condition during the power matching mode as is the case in the third embodiment shown in FIG. 4. On the other hand, where the biasing force $\Delta P_G$ is larger than the biasing force $\Delta P_L$, the valve 101 will not operate. In addition, where the actuators 4, 5 and 6 do not operate at all such as occurring, for example, subsequent to the completion of the filling of the resinous material and during the pressure control in which the pilot relief valve 50 attains the set pressure and, therefore, should operate, the valve 17 is held at a position intermediate between the positions $V_1$ and $V_2$ to set the swash plate of the pump 1 at the neutral position so that the pressure control can be performed while the discharge rate is zero. However, in the embodiment shown in FIG. 7, the valve 101 operates when the biasing force $\Delta P_G$ is smaller than the biasing force $\Delta P_L$, but does not operate when the biasing force $\Delta P_G$ is larger than the biasing force $\Delta P_L$.

On the other hand, when the selector valve 21 is set in the position $S_2$, the power matching pilot line (34, 32) is closed and, at the same time, the spring chamber 40 of the valve 17 is communicated to a portion of the main line 2 upstream of the valve 101 through the pilot line 37 having the feed-in orifice 36. Accordingly, the pressure inside the spring chamber 40 of the valve 17 becomes equal to the pressure inside the pilot chamber 42, thereby setting the valve 17 to the position $V_2$. Then, the swash plate is inclined to a position determined by the adjustment screw 55 so as to increase the discharge rate and, therefore, the pump 1 operates as a fixed volumetric pump which discharges a predetermined amount of fluid medium. When the electromagnetic switching valve 152 is set in the position $S_{12}$ during this condition, the check valve 18a is opened to permit the accumulator 105 to discharge the fluid medium therefrom. The valve 101 operates to reduce the pressure of the fluid medium from the accomulator 105 combined with the fluid medium from the pump 1 then operating as a fixed volumetric pump. That is to say, the flow control is performed under the accumulator mode as is the case in the third embodiment.

The fifth embodiment shown in FIG. 8 differs from the third embodiment shown in FIG. 4 in the following points. In other words, in the embodiment shown in FIG. 8, a bypass type pressure compensated valve 18 is disposed on the main line 2 between the first orifice 3a and the valve 101, having its spring chamber 45 fluid-connected to the pilot relief valve 50a. In addition, a pilot switching valve 202 is utilized as shown in association with the mode selector valve 21a.

Figure 8:
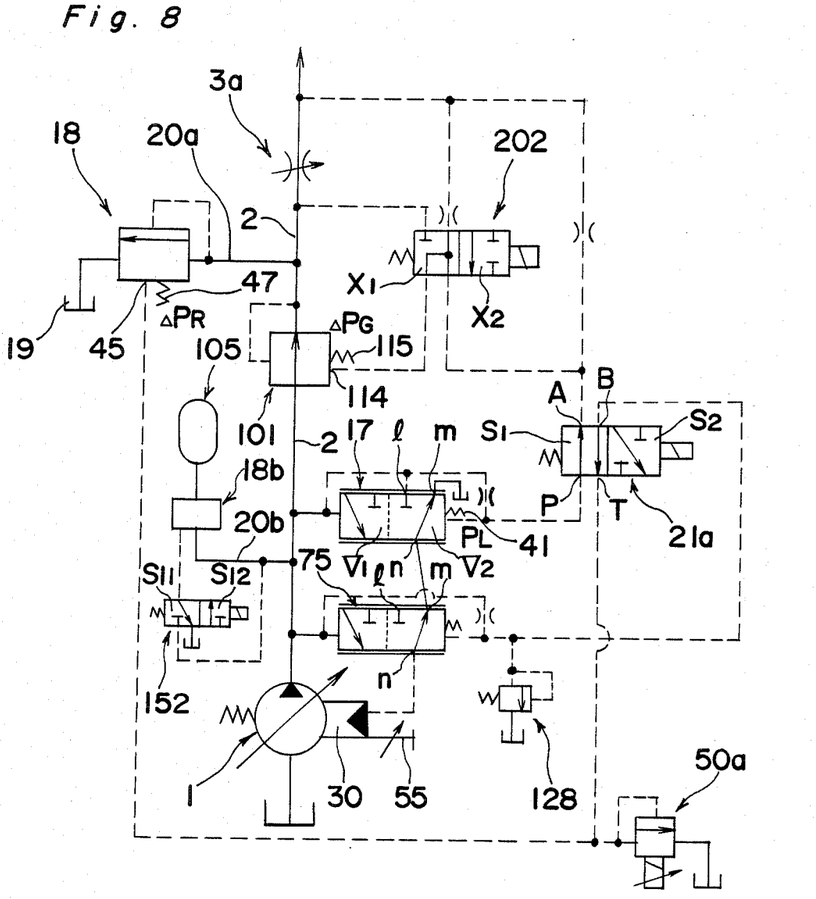

In this embodiment shown in FIG. 8, the biasing force $\Delta P_L$ of the spring 41 of the valve 17, the biasing force $\Delta P_G$ of the spring 115 of the valve 101 and the biasing force $\Delta P_R$ of a spring 47 of the bypass type pressure compensated valve 18 are respectively set to 10 Kg/cm², 6 Kg/cm² and 8 Kg/cm².

And, the mode selection valve 21a is set in the position $S_1$, the pilot switching valve 202 is set in a position shown by $X_1$ in FIG. 8, and the switching valve 152 is set in the position $S_{11}$.

When this is done, the valve 18 is closed and remains standstill with no fluid medium discharged from the accumulator 105, but the pump 1, the valve 17 and the valve 101 operate and, therefore, the system shown in FIG. 8 operates under the power matching mode.

When the selector valve 21a and the valve 152 are respectively set in the position $S_2$ and $S_{12}$, the valve 17 is set in and held standstill at the position $V_{11}$ with the pump 1 consequently operating as a fixed volumetric pump which gives the maximum discharge rate, the valve 18 is closed and held standstill and the accumulator 105 and the valve 101 operate, whereby the system of FIG. 8 is operated under the accomulator mode.

When the valve 202 and the valve 152 are subsequently set in the respective positions $X_2$ and $S_{11}$, the valve 101 remains opened, the accumulator 105 does not operate, the pump 1 operates as the fixed volumetric pump giving the maximum discharge rate, and the valve 18 operates to permit the excessive fluid medium to be drained into the reservoir 19 to control the differential pressure between the upstream and downstream sides of the first orifice 3a to the predetermined value. In this way, the system operates under the power matching mode.

Accordingly, the fluid flow control system according to the fifth embodiment shown in FIG. 8 can be selectively operated under the power matching mode and the maximum discharge flow mode one at a time. In addition, during the maximum discharge flow mode of operation, the system can also be selectively operated in the accumulator mode and the pressure matching mode one at a time.

It is to be noted that the bypass type pressure compensated valve 18 used in the embodiment of FIG. 8 may be replaced with the surge absorbing valve 106 shown in FIG. 4 as employed in the third embodiment.

From the foregoing, it has now become clear that the fluid flow control system according to the present invention has two selective capability of operating under the power matching mode and the maximum discharge flow mode one at a time. Specifically, the switching over from one mode to the other can be performed merely by changing the valve position of the pilot switching valve and the valve at an appropriate time required by the actuators. Accordingly, while the single variable-displacement pump is used for all of the operating modes of the system, the power consumption can be minimized by switching over the system so as to operate under the power matching mode on the one hand and, on the other hand, by switching over the system so as to operate under the maximum discharge flow mode is including the pressure matching mode and the accumulator mode, not only can the high responsivity and the high speed controllability be appreciated, but the feedback control of the speed and/or pressure can also be achieved. In addition, when the system operates under the maximum discharge flow mode, the fluid medium can be discharged from the pump under high pressure in a maximum discharge rate and then fed back to the reservoir with the pressure energy efficiently converted into the heat energy to rapidly heat the fluid medium. Therefore, the time required to perform the warm-up operation can advantageously be reduced.

Moreover, if a manifold is formed to suit with the fluid flow control system of the present invention, the fluid flow control system of the present invention can be used exclusively for the operation under any one of the pressure matching mode or the accumulator mode and the power matching mode only by employing a simple modification, for example, closing the manifold by the use of a cover or a plug. Accordingly, the system of the present invention effectively contributes to the standardization of the manifold and, also, effectively and readily meets the optional requirements.

Especially, the system of the present invention is effectively applicable to the injection molding machine in view of the fact that the various hydraulic cylinders and their associated fluid circuit components are operated under different modes one at a time.

Figure 9:
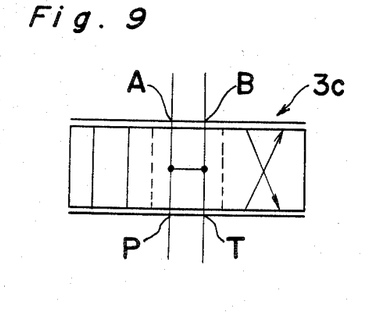
FIGS. 9 and 10 are schematic representations, respectively, of substitutes for an orifice used in the system.
Figure 10:
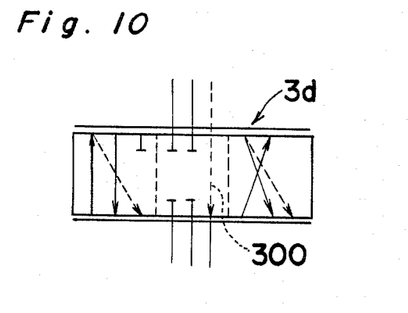

Although the present invention has fully been described in connection with the preferred embodiments thereof with reference to the accompanying drawings, it is to be noted that various changes and modifications are readily apparent to those skilled in the art. By way of example, although the pump has been described as being of a type of which the discharge rate decreases as the fluid pressure supplied to the discharge flow control section 30 increases, it may be of a type whose discharge rate increases as the fluid pressure supplied to the control section 30 increases. In addition, instead of the use of the orifice 3a, either an orifice switching valve shown by 3c in FIG. 9 or an orifice switching valve, shown by 3d in FIG. 10, having a neutral unload passage 300 may be employed.

Moreover, the mode selector valve may be in the form of a multi-port switching valve including a two-port switching valve. In the case of the two-port switching valve, it may be combined with another two-port switching valve.

Therefore, such changes and modifications are to be understood as included within the spirit and scope of the present invention unless they depart therefrom.

What is claimed is:

1. A fluid flow control system comprising means for operating selectively in a power matching mode and a maximum discharge flow mode, which comprises a variable displacement pump (1) having a discharge flow control section (30), said pump operating in a variable discharge mode in said power matching mode and in a constant discharge mode in said maximum discharge mode; at least one actuator; a main line (2) extending between the pump (1) and the actuator and having a restriction means (3, 3a, 3b, 3c, 3d) disposed therein; a load sensing valve (17) having pilot and spring chambers; a first fluid circuit including a power matching pilot line (32, 34) in selective communication with said spring chamber and a first pilot line (31) in communication with said pilot chamber, the differential pressure between the upstream and downstream sides of the restriction means (3, 3a, 3b, 3c, 3d) being supplied to the pilot and spring chambers of the load sensing valve (17) in said power matching mode to operate said load sensing valve (17) to connect the discharge flow control section (30) selectively to one of the main line (2) and a fluid reservoir to control the discharge rate of the pump (1) such that said differential pressure upstream and downstream of said restriction can be controlled to a predetermined value in the power matching mode; a branch line (20a, 20b) extending outwards from a portion of the main line (2) upstream of the restriction means (3, 3a, 3b, 3c, 3d); a valve means (18, 18a) disposed on the branch line (20a, 20b) and operable to open when the load sensing valve (17) is rendered non-functional to control the pump and the pump (1) is operated in a maximum discharge mode; a mode selector valve (21, 21a) disposed on the power matching pilot line (32, 34) for selectively closing and opening the power matching pilot line (32, 34); and a second pilot line (37) capable of fluid-connecting the spring chamber (40) and the pilot chamber of the load sensing valve (17) to a portion of the main line (2) upstream of the restriction (3, 3a, 3b, 3c, 3d), thereby rendering the load sensing valve non-functional and selecting the maximum discharge mode; whereby the power matching mode can be established when the power matching pilot line (32, 34) is opened to operate the load sensing valve (17) and, on the other hand, the maximum discharge flow mode can be established when the power matching pilot line (32, 34) is closed and the second pilot line is opened to make the pressures respectively in the pilot and spring chambers of the load sensing valve (17) equal to each other, whereby the load sensing value (17) is rendered non-functional and held in one position by the action of a spring thereof thereby causing said pump (1) to operate at a maximum discharge rate and to simultaneously permit the valve means (18, 18a) to open.

2. A system as claimed in claim 1, wherein said valve means is a bypass type pressure compensated valve (18) for controlling the differential pressure between the upstream and downstream sides of the restriction means to a predetermined value, whereby the maximum discharge flow mode is a pressure matching mode.

3. A system as claimed in claim 1, wherein said valve means is a shut-off valve in fluid communication with an input port of an accumulator whereby the maximum flow mode is an accumulator mode.

4. A system as claimed in claim 3, further comprising a pressure reducing pressure compensated valve (101) disposed on a portion of the main line (2) upstream of the restriction means (3, 3a, 3b, 3c, 3d) for controlling the pressure differential to the predetermined value.

5. A system as claimed in claim 4 wherein said valve means comprises a bypass type pressure compensated valve (18) for controlling the differential pressure to the predetermined value and a shut-off valve (18a) in fluid communication with an input port of an accumulator (105).

6. A system as claimed in any one of claims 1, 2, 3, 4 or 5, further comprising a pressure control pilot valve (75) disposed between the load sensing valve (17) and the discharge flow control section (30) for selectively fluid-connecting the discharge flow control section (30) to one of the main line (2) and a port (n) of the load sensing valve (17), and a pilot relief valve (50) fluid-connected to a spring chamber (82) of the pressure control pilot valve (75).

7. A system as claimed in claim 6, further comprising a second pilot line (85) having a feed-in restriction (84), said spring chamber (82) of the pressure control pilot valve (75) being fluid-connected to the main line (2) through said second pilot line (85).

8. A system as claimed in claim 7, further comprising a second branch line (103) extending from the upstream side of the restriction means (3, 3a, 3b, 3c, 3d), and a surge pressure absorbing valve (106) disposed on said second branch line (103).

9. A system as claimed in claim 8, wherein said restriction means is an orifice (3a, 3b).

10. A system as claimed in claim 8, wherein said restriction means is an orifice switching valve (3c).

11. A system as claimed in claim 8, wherein said restriction means is an orifice switching valve (3d) having a neutral unload passage.

12. A system as claimed in claim 7, wherein said feed-in restriction is a feed-in orifice (84).

* * * * *